March 10, 1936.  G. BROULHIET  2,033,813
RIGID MOTOR CARRIAGE FRAME
Filed May 12, 1933  7 Sheets-Sheet 1
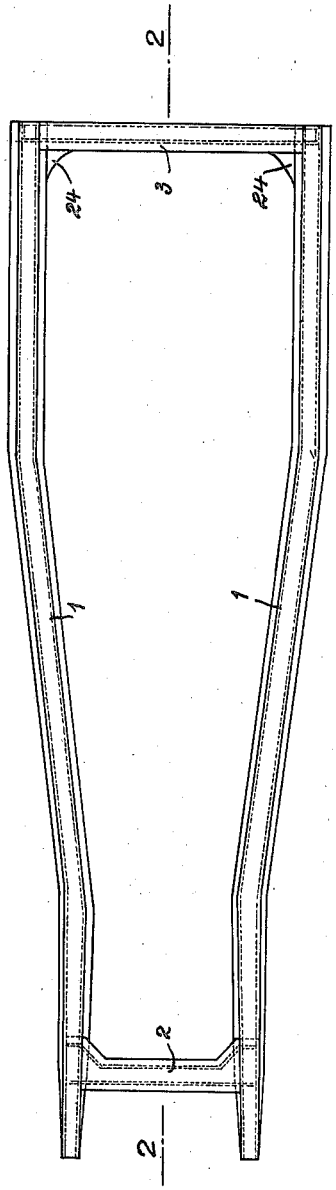
INVENTOR
GEORGES BROULHIET
BY
ATTORNEYS March 10, 1936.                G. BROULHIET                2,033,813
                         RIGID MOTOR CARRIAGE FRAME
                     Filed May 12, 1933          7 Sheets-Sheet 2
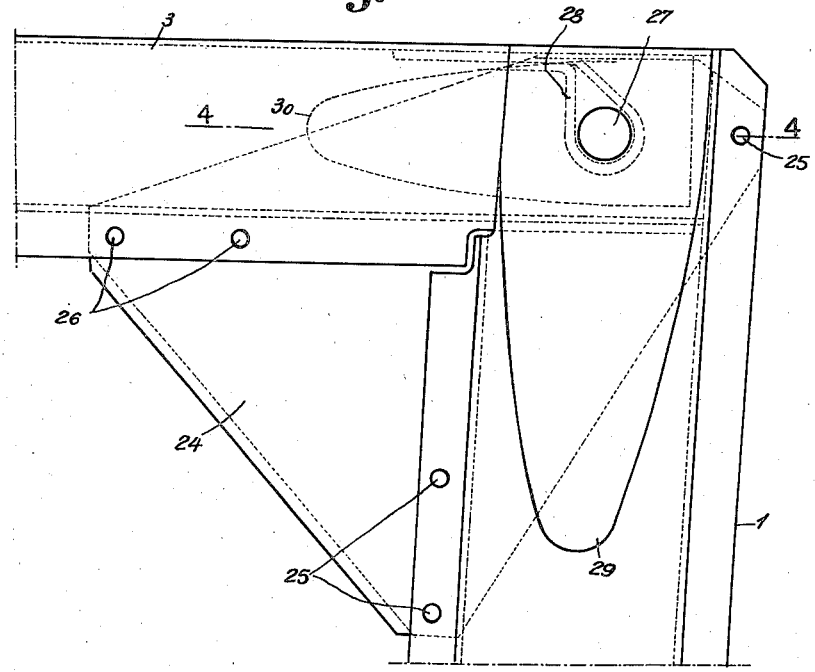
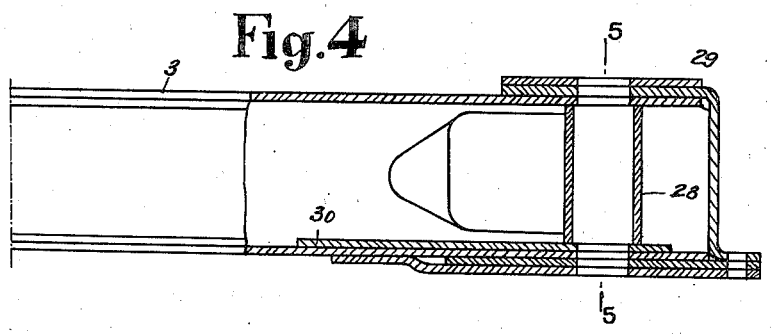
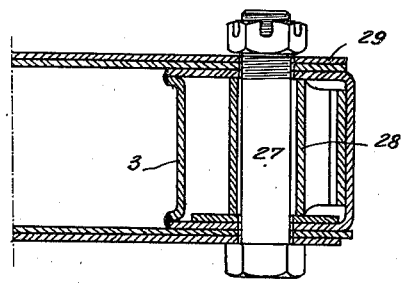
INVENTOR
GEORGES BROULHIET
BY Richards & Geier
ATTORNEYS

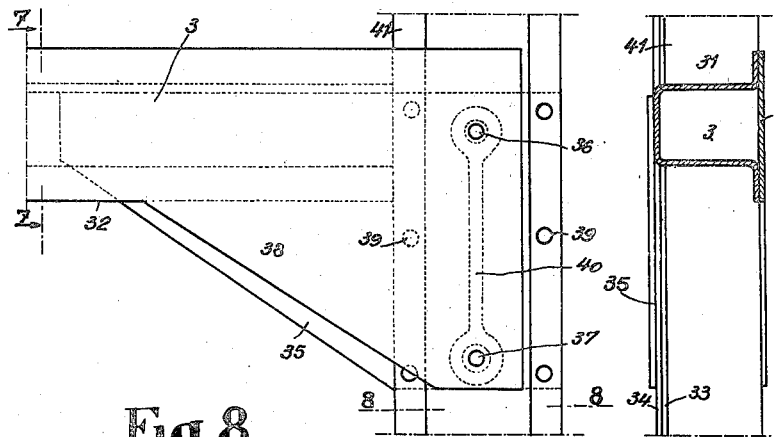
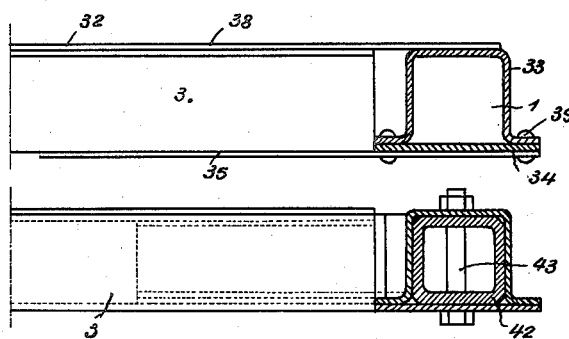
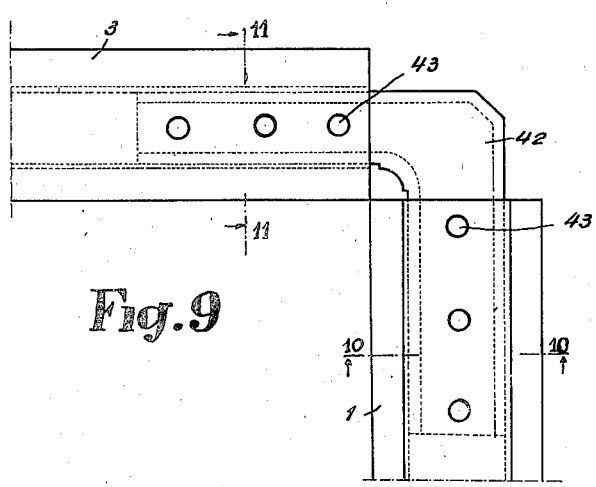
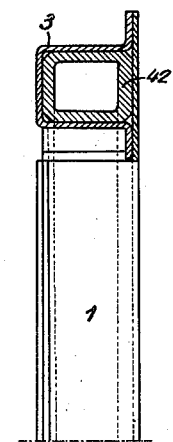

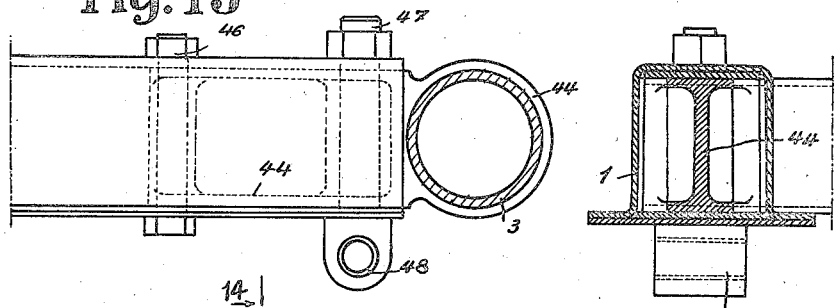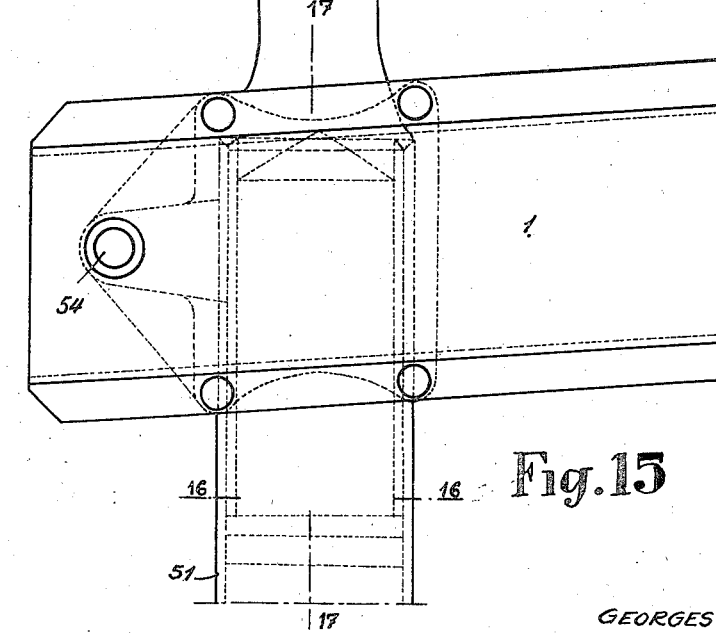

March 10, 1936.　　　G. BROULHIET　　　2,033,813
RIGID MOTOR CARRIAGE FRAME
Filed May 12, 1933　　　7 Sheets-Sheet 5

INVENTOR
GEORGES BROULHIET
BY
ATTORNEYS

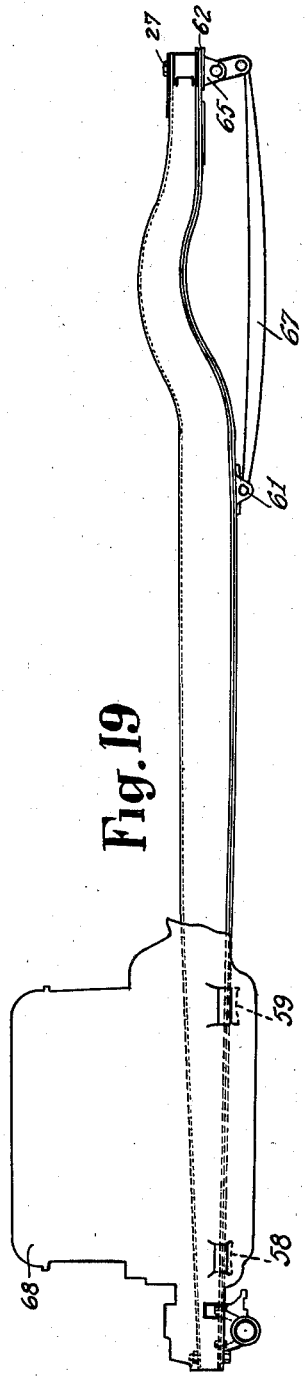
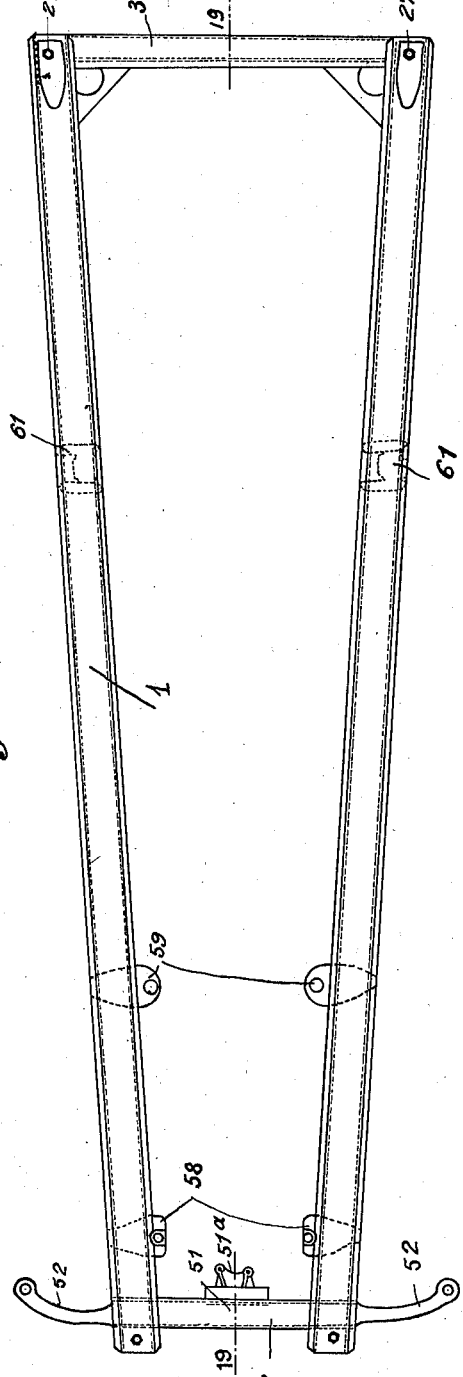

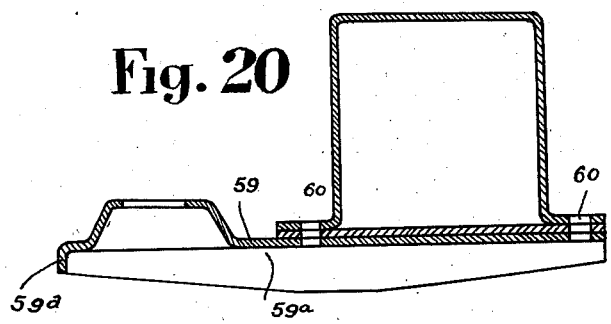
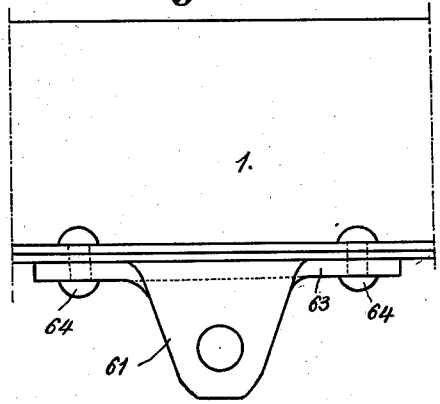
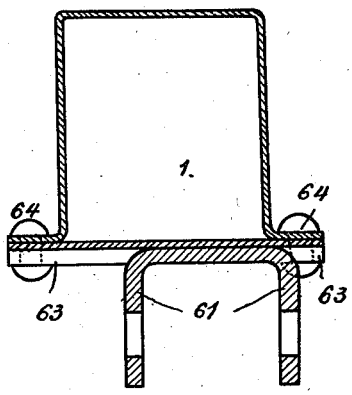
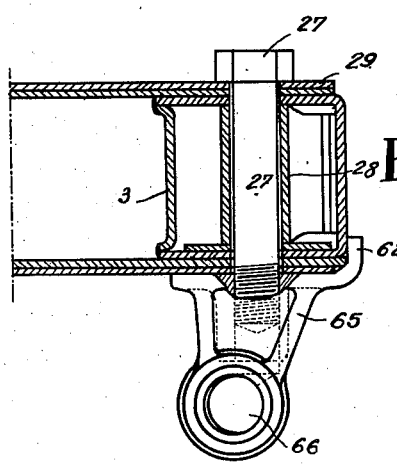

Patented Mar. 10, 1936

2,033,813

UNITED STATES PATENT OFFICE 2,033,813

RIGID MOTOR CARRIAGE FRAME

Georges Broulhiet, Paris, France

Application May 12, 1933, Serial No. 670,728
In France May 19, 1932

29 Claims. (Cl. 280—106)

This invention relates to improvements in carriage frames.

It has been experimentally shown that a vehicle running upon the road keeps much better to the ground when the frame is capable not only of resistance to bending stresses due to the loads that are being transported, but also to the torsional stresses due to the movements of the wheels caused by the uneveness of the road and the ruts in the running paths of the car.

The frame according to the present invention is designed to resist both the bending and the torsional stresses and it is particularly characterized in that the longitudinal and the cross bearers are both of tubular section and that the assembling in the angles between said elements is effected in such a manner as to produce a continuous resistance to torsional stresses.

This invention has more particularly for its object the use of longitudinal members having a tubular cross section, which are constituted by a pressed U-shaped part provided with turned in flanges and a closing sheet metal plate engaging said flanges to which it is rigidly secured by electric spot welding, arc welding or autogenous welding.

Owing to this arrangement of the longitudinal members the fixing of the various parts of the frame such as motor, carriage body, shock absorbers, accumulator box, steps, etc. to said members is greatly facilitated by the double thickness constituted by the flange of the U-shaped part and the edge of the closing sheet metal plate. This double thickness may be perforated with bolt holes without it being necessary to pass through the hollow body of the longitudinal member; owing to this arrangement the construction is facilitated and the modulus of inertia of the longitudinal member is integrally preserved.

A further object of the present invention consists also in the mode of assembling of the tubular longitudinal members to the cross bearers which will be hereinafter described.

The end of one of the tubular members may be engaged in the other tubular member or on the contrary may surround it completely or partially, the connection being effected by welding, riveting or bolting. Means such as gussets on one or on both sides of the frame or surrounding gussets may be provided, these various devices being used together or separately. The tubular elements may be provided if necessary with an inner reinforcement at the connecting points and preferably with connecting ties surrounding the bolts which pass through the hollow part of the tubular element.

The end of one of the tubular members may abut and be fixed against the other tubular member by welding, by the intermediary of a connecting part secured in the abutted member and connected with the other member by means of gussets either upon one side or upon both sides of the frame, or by the intermediary of surrounding gussets, these various means being utilized together or separately and the tubular members being innerly reinforced when necessary at the connecting point.

The tubular elements may be joined end to end, the joint being effected by welding, by means of an angle bar entering in both tubular members or in one of them only and passing around the other, or by means of one or several gussets or of one surrounding gusset, these various means being employed together or separately.

When one of the tubular members consists of a pressed U-shaped part in which the ends of the branches are bent so as to form flanges in parallel with the bottom of the U which are joined together by means of a horizontal sheet metal plate pressed against them, the ends of the latter may be made wider so as to form a gusset. In the same manner, when one of the tubular members is constituted by two U-shaped pressed parts fitted one in the other the widened portion of the branches may serve as a gusset.

In the frames of the present system the bolts used for assembling the corners may be used for fixing the carriage parts which are to be attached to the frame.

The drawings provided with this specification illustrate by way of examples, which are not restrictive, several embodiments of the present invention as applied to motor vehicle frames and various types of tubular elements utilized for these applications.

Fig. 1 is a plan view of a motor carriage frame according to the present invention.

Fig. 2 is a sectional elevation on the line 2—2 of Fig. 1.

Fig. 3 is a plan view of a mode of assembling in which the end of a tubular member is fitted inside the other adjacent element.

Figs. 4 and 5 are vertical sectional views of the same mode of assembling taken on the line 4—4 of Fig. 3 and on the line 5—5 of Fig. 4 respectively.

Fig. 6 is a plan view of a mode of assembling in which the end side of one of the members engages a vertical side of the other member, the connection being insured by means of gussets.

Figs. 7 and 8 are vertical sectional views of the above mode of assembling on the lines 7—7 and 8—8 of Fig. 6, respectively.

Fig. 9 is a plan view of a mode of assembling in which the ends of both tubular members are connected by an angle piece fitted in both members.

Figs. 10 and 11 are vertical sectional views of same on the lines 10—10 and 11—11 of Fig. 9, respectively.

Fig. 12 is a plan view of a mode of assembling in which the ends of both tubular elements are connected by an angle piece fitted inside one of the tubular parts and around the other.

Figs. 13 and 14 are vertical sectional views of same, on the lines 13—13 and 14—14 of Fig. 12 respectively.

Fig. 15 is a plan view of a mode of assembling of two tubular elements by means of a part that surrounds one of the members and is secured against the other.

Figure 16:
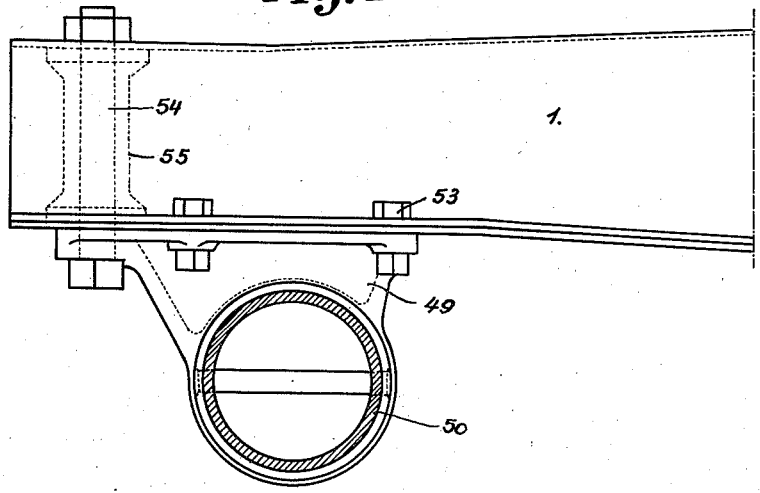
Figure 17:
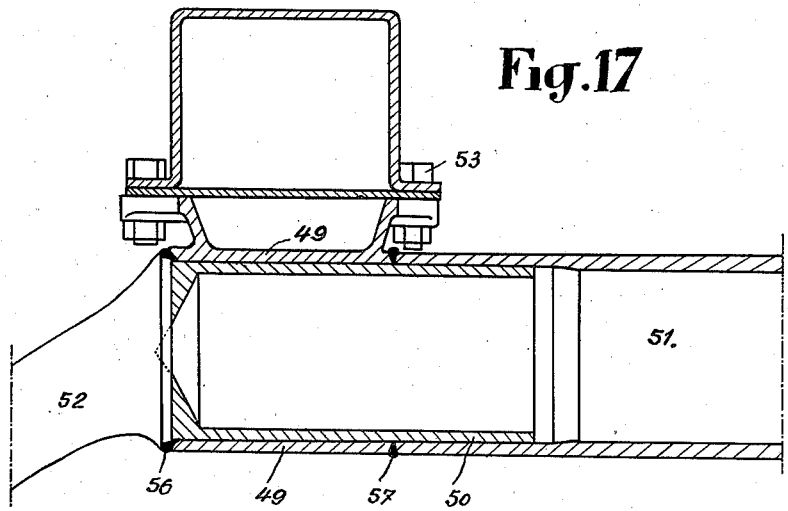

Figs. 16 and 17 are vertical sectional views of same on the lines 16—16 and 17—17 of Fig. 15 respectively.

Fig. 18 shows the whole carriage frame in plan view, and Fig. 19 is a sectional view on the line 19—19 of Fig. 18 with a diagrammatic showing of a motor housing and a spring to show their relation to the frame structure.

Fig. 20 is a vertical section illustrating the fixing of a motor support to a longitudinal member.

Figs. 21 and 22 show in elevation and in transverse vertical section the fixing to the longitudinal member of a rear spring front carrier.

Fig. 23 is an elevation showing the fixing of a rear spring back carrier.

Fig. 24 is a cross section of a preferred kind of longitudinal member and Fig. 25 a similar view of cross bearer.

Referring more particularly to the Figs. 1 and 2 of the drawings, the carriage frame as therein shown is constituted by two longitudinal tubular members 1 and two tubular cross bearers 2, 3.

The longitudinal members have a tubular cross section, for instance such as illustrated in Fig. 24.

The cross section of the front cross bearer 2 has the same shape but inverted. The rear cross bearer 3 is constituted by two U-shaped elements having a cross section such as illustrated in Fig. 25.

In the assembling shown in Figs. 3, 4, and 5, the cross bearer 3 which has a cross section for instance such as illustrated in Fig. 25, enters in the longitudinal member which comprises for instance an inverted U-shaped member having bent flanges and a closing plate as in Fig. 24, the edges of the cross bearer being reduced as shown in Fig. 5.

The assembling is realized by means of a gusset 24 which is connected by rivets 25 to the flanges of the longitudinal member reinforced by the closing sheet metal plate, rivets 26 connecting the gusset plate 24 and the lower flanges of the cross bearer 3 and a bolt 27 may be used for securing the rear spring back carrier. The tie means 28 around the bolt 27 consists for example of a rolled sheet metal band connected by welding to the cross bearer 3 thus facilitating the building up of the frame. A cut out sheet metal part 29 is connected by welding upon the longitudinal bearer with the object of reinforcing same, while the cut out sheet metal part 30 is a reinforcing element which is secured by welding in the cross bearer 3.

In the case of it being found necessary to increase the strength of the assembling two gussets 24 placed one above the other as shown in the drawings may be used. The two gussets 24 may also be connected together by making them of one sheet steel plate bent around the cross bearer 3 for example.

In the mode of execution shown in Figs. 6, 7, and 8, the cross bearer 3 abuts and is fixed against the longitudinal bearer 1. The cross bearer 3 may be constituted by a pressed U-shaped part 31, having turned out edges, closed by an upper sheet metal plate 32.

The longitudinal member 1 may consist of a pressed U-shaped part 33, with closing sheet metal plate 34 as in the case of Figs. 3, 4, and 5.

The connection is produced by means of a gusset 35 integral with the cross bearer 3 and secured upon the longitudinal member by means of bolts 36, 37 and of rivets or bolts 39 and by the wide portion 38 of the closing plate 32 of the cross bearer 3 which is attached to the longitudinal members 1 by means of bolts 36, 37.

A forged piece 40 forms a tie for the bolts 36, 37, one of which may be utilized for fixing the back carrier of the rear spring.

The extension 41 of the longitudinal member 1 may be used for example as support for the back trunk.

In the mode of execution shown in Figs. 9, 10, and 11, the cross bearer 3 and the longitudinal member are both abutted and are constituted by a pressed U-shaped part and a closing sheet metal plate.

The assembling is realized by an angle bar 42 fitted inside the longitudinal member 1 and the cross bearer 3 and secured by means of bolts 43 which may assist in fixing the carriage parts which are to be connected to the frame.

In the mode of execution shown in Figs. 12, 13, and 14, the cross bearer 3 and the longitudinal member 1 are both abutted. The cross bearer 3 has for example a circular cross section as in the preceding example constituted by a U-shaped part and a closing sheet metal plate. The assembling is effected by an angle bar 44 fitted inside the longitudinal member 1 and around the cross bearer 3.

The cross bearer 3 is secured in the part 44 for example by driving it forcibly in position and strengthening the joint by welding at 45.

The part 44 is secured in the longitudinal member 1 for example by means of bolts 46, 47, the part 44 acting as tie for said bolts.

In the example shown, a hole 48 provided in the lower head of the bolt 47 allows the use of the latter as fixing means for the spring carriers. In the mode of assembling illustrated in Figs. 15 to 17, the front axle is constituted by a tube 51 connected on both sides with an end piece 52. The assembling is effected for example by welding as at 56, 57 when a part 49 has been driven in.

The part 49 is secured to the longitudinal member by bolts 53 on the one part and by a bolt 54 on the other part, a tie piece 55 being provided around the latter inside the longitudinal member.

In the carriage frame shown diagrammatically in Figs. 18 and 19, the front axle 51 serves as front cross bearer and is connected with the longitudinal member by the intermediary of the device shown in Figs. 15 to 17.

The rear axle is connected with the longitudinal members in the manner shown in Figs. 3 to 5.

A bracket 51ᵃ for the cross front spring is fixed upon the tube 51.

The motor is carried upon four supports 58, 58, 59, 59 fixed upon the longitudinal members.

The support 59 for the motor 68 is shown in section in Fig. 20. It will be seen that it consists of a pressed part provided with a circumferential strengthening edge 59ᵃ and that it is secured by bolts or rivets at 60 upon the edges having a double thickness of the longitudinal member which is composed of a U-shaped part and a closing sheet metal plate.

Figs. 18 and 19 show also the rear spring front carriers 61 for the rear spring 67, one of which is shown in detail in Figs. 21 and 22, and the rear spring back carriers 62, one of which is shown in Fig. 23.

The rear spring front carriers may be constituted for example by a sheet metal housing 63 bent at 61 to accommodate the connecting pin of the spring. The plate 63 is bolted or riveted at 64 upon the edges having a double thickness of the longitudinal member.

Each rear spring back carrier is constituted for example by a part (Fig. 23) forming an angle plate provided with a lower extending boss 65 having an eye 66.

The angle plate 62 is fitted below and at the end of the longitudinal member by means of a screw 27 which serves also for assembling the back cross bearer to the longitudinal member.

What I claim and desire to secure by Letters Patent of the United States is:

1. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, said connecting means being secured to said flanges.

2. A rigid motor car frame comprising tubular longitudinal and front and rear cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, and members secured directly to said flanges for supporting the vehicle parts.

3. A motor vehicle frame which comprises four tubular members, comprising two tubular longitudinal members and two tubular cross bearers, these members being connected by assembling means capable of resisting torsional stresses, so as to insure a continuous resistance to torsional stresses upon the whole circumference of the frame, each of said longitudinal tubular members being itself constituted by an element having a U-section with out-turned edges and a closing plate fitted across the open part of the U and secured to the out-turned flanges thereof to constitute portions having a double thickness of metal lying in a horizontal plane, and members secured directly to said horizontal flanges for supporting vehicle parts.

4. In a frame according to claim 2, the front cross member constituting the front axle, said axle including a portion having a face located opposite the horizontal flanges of said longitudinal members, and means securing said portion to said horizontal flanges.

5. A rigid frame for a vehicle having a motor, comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, and members secured to both the flanges on each longitudinal frame member for supporting the motor of the vehicle.

6. A rigid frame for a vehicle having a supporting spring, comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, and members secured directly to said flanges for supporting at least one end of the spring of the vehicle.

7. A rigid motor car frame comprising tubular longitudinal and front and rear cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, the horizontal flanges of the longitudinal members being disposed at the lower part thereof, and the front cross member embodying end pieces each having an upper face located below the lower face of one of the longitudinal members and secured thereto by means of fixing means cooperating with said horizontal flanges.

8. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, the closing plates of the longitudinal members being provided, at the connecting points with a cross member, with widened portions constituting gussets designed to reinforce the connection with said cross bearer.

9. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges and a plate secured to said flanges and closing the channel of the U, thereby forming flanges of double thickness, the end of one tubular member extending within the other tubular member at the point of connection therebetween.

10. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, the end of one tubular member extending within the other tubular member at the point of connection therebetween, and steel sheet metal gussets secured to said members to reinforce the connection.

11. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, one of said members abutting against and being secured to the other by means of gussets connected to said flanges.

12. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, the connecting means comprising a part extending within one of said members and secured therein.

13. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, the connecting means comprising a part extending within one of said members and secured to the exterior of the other tubular member.

14. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, the connecting means comprising a part which fits inside one of the members and around the other.

15. A rigid motor car frame comprising tubular longitudinal and cross members, means to connect said members, said means being capable of resisting and transmitting torsional stresses so that said frame acts as a continuous member, at least each longitudinal frame member comprising a U-shaped element having the legs of the U bent outwardly to form horizontal flanges, plates secured to said flanges and closing the channel of the U, thereby forming flanges of double thickness, the connecting means comprising a part which fits around one of said members and is secured against the other.

16. A rigid motor car frame comprising longitudinal members and front and rear cross members, means to connect said members, at least each longitudinal frame member comprising a U-shaped element having the legs of the U bent outwardly to form horizontal flanges, and at least one plate secured to the flanges of each longitudinal member and closing the channel of the U, thereby forming flanges of double thickness, said connecting means being secured to said flanges.

17. A rigid motor car frame comprising longitudinal members and cross members, means to connect said members, at least each longitudinal frame member comprising a U-shaped element having the legs of the U bent outwardly to form horizontal flanges and at least one plate secured to the flanges and closing the channel of the U, thereby forming flanges of double thickness, and members secured directly to said flanges for supporting the vehicle parts.

18. In a frame according to claim 16, one of said cross members constituting the front axle, said axle including a portion having a face located opposite the horizontal flanges of said longitudinal members, and means securing said portion to said horizontal flanges.

19. A rigid frame for a vehicle having a motor, comprising longitudinal members and cross members, means to connect said members, at least each longitudinal frame member comprising a U-shaped element having the legs of the U bent outwardly to form horizontal flanges, and a plate secured to said flanges and closing the channel of the U, thereby forming flanges of double thickness, and members secured to both the flanges of each longitudinal frame member for supporting the motor of the vehicle.

20. A rigid frame for a vehicle having a supporting spring, comprising longitudinal members and cross members, means to connect said members, at least each longitudinal frame member comprising a U-shaped element having the legs of the U bent outwardly to form horizontal flanges and a plate secured to said flanges and closing the channel of the U, thereby forming flanges of double thickness, and members secured directly to said flanges for supporting at least one end of the spring of the vehicle.

21. A rigid motor car frame comprising longitudinal members and cross members, means to connect said members, at least each longitudinal frame member comprising a U-shaped element having the legs of the U bent outwardly to form horizontal flanges and a plate secured to said flanges and closing the channel of the U, thereby forming flanges of double thickness, the closing plates of the longitudinal members being provided, at the connecting points with a cross member, with widened portions constituting gussets designed to reinforce the connection with said cross bearer.

22. A rigid motor car frame comprising longitudinal members and front and rear cross members, means to connect said members, at least each longitudinal frame member comprising a U-shaped element having the legs of the U bent outwardly to form horizontal flanges and a plate secured to said flanges and closing the channel of the U, thereby forming flanges of double thickness, the horizontal flanges of the longitudinal members being disposed at the lower part thereof, and the front cross member embodying end pieces each having an upper face located below the lower face of one of the longitudinal members and secured thereto by fixing means cooperating with said horizontal flanges.

23. A rigid motor car frame according to claim 16, in which at least some of the cross members are constituted of tubular members.

24. A rigid motor car frame according to claim 17, in which at least some of the cross members are constituted of tubular members.

25. In a frame according to claim 16, in which at least some of said cross members are constituted of tubular members, one of said cross members constituting the front axle, said axle including a portion having a face located opposite the horizontal flanges of said longitudinal members, and means securing said portion to said horizontal flanges.

26. A rigid motor car frame according to claim 19, in which at least some of the cross members are constituted of tubular members.

27. A rigid motor car frame according to claim 20, in which at least some of the cross members are constituted of tubular members.

28. A rigid motor car frame according to claim 21, in which at least some of the cross members are constituted of tubular members.

29. A rigid motor car frame according to claim 22, in which at least some of the cross members are constituted of tubular members.

GEORGES BROULHIET.